US012654812B2

(12) United States Patent
Duensing et al.

(10) Patent No.: US 12,654,812 B2
(45) Date of Patent: Jun. 16, 2026

(54) SYSTEMS AND PROCESSES FOR RECOVERING A CONDENSATE FROM A CONDUIT

(71) Applicant: SOFEC, INC., Houston, TX (US)

(72) Inventors: Martin Matthew Duensing, Cypress, TX (US); Alan R. Cordy, Katy, TX (US); Jared E. Cmaidalka, Manvel, TX (US)

(73) Assignee: MODEC AMERICA, INC., Houston, TX (US)

( * ) Notice: Subject to any disclaimer, the term of this patent is extended or adjusted under 35 U.S.C. 154(b) by 387 days.

(21) Appl. No.: 18/523,521

(22) Filed: Nov. 29, 2023

(65) Prior Publication Data

US 2024/0174326 A1 May 30, 2024

Related U.S. Application Data

(60) Provisional application No. 63/428,908, filed on Nov. 30, 2022.

(51) Int. Cl.
*B63B 22/02* (2006.01)
*B67D 9/00* (2010.01)

(52) U.S. Cl.
CPC .............. *B63B 22/026* (2013.01); *B67D 9/00* (2013.01)

(58) Field of Classification Search
CPC ..... B63B 22/00; B63B 22/021; B63B 22/026; B67D 9/00
USPC ................................ 441/1, 4, 21–23, 28–32
See application file for complete search history.

(56) References Cited

U.S. PATENT DOCUMENTS

| | | | | |
|---|---|---|---|---|
| 3,969,781 | A | | 7/1976 | Reid, Jr. |
| 4,042,990 | A | * | 8/1977 | Donaldson, Jr. ...... B63B 22/021 441/5 |
| 4,310,937 | A | | 1/1982 | Karl et al. |
| 4,315,408 | A | | 2/1982 | Karl et al. |
| 4,339,002 | A | | 7/1982 | Gibbs |
| 4,468,848 | A | | 9/1984 | Anderson |
| 4,501,525 | A | | 2/1985 | Grundy et al. |
| 4,556,340 | A | | 12/1985 | Morton |
| 4,906,137 | A | | 3/1990 | Maloberti et al. |
| 6,021,848 | A | | 2/2000 | Breivik et al. |
| 6,415,828 | B1 | | 7/2002 | Duggal et al. |
| 6,558,215 | B1 | | 5/2003 | Boatman |
| 7,416,025 | B2 | | 8/2008 | Bhat et al. |

(Continued)

*Primary Examiner* — Tye William Abell
(74) *Attorney, Agent, or Firm* — Edmonds & Cmaldalka, P.C.

(57) ABSTRACT

Systems and processes for recovering a condensate from a conduit. The system can include a buoy that can include a fluid swivel assembly. The system can also include a floating conduit and first and second gas transfer conduits that can be in fluid communication with the fluid swivel assembly and configured to transfer a gas discharged from a vessel storage tank to a gas pipeline. The system can also include first and second liquid transfer conduits in fluid communication with the fluid swivel assembly and configured to transfer a liquid from a liquid pipeline to the vessel storage tank. The system can also include a condensation conduit configured to transfer at least a portion of any condensate that accumulates within an internal volume of the floating conduit into a fluid flow path defined by the fluid swivel assembly, the second liquid transfer conduit, or the first liquid transfer conduit.

20 Claims, 10 Drawing Sheets

(56) References Cited

U.S. PATENT DOCUMENTS

| | | | |
|---|---|---|---|
| 8,430,170 | B2 | 4/2013 | Pionetti |
| 10,794,539 | B1 * | 10/2020 | Duensing .............. B63B 22/026 |
| 10,899,602 | B1 | 1/2021 | Liu et al. |
| 11,401,154 | B2 | 8/2022 | Hjijsmans-Steenkamp et al. |
| 11,401,155 | B1 | 8/2022 | Van Sloten et al. |
| 11,459,067 | B2 | 10/2022 | Duensing et al. |
| 2011/0120126 | A1 * | 5/2011 | Srinivasan ................ F03G 7/05 60/641.7 |
| 2011/0268508 | A1 | 11/2011 | Witz |
| 2013/0240085 | A1 | 9/2013 | Hallot et al. |
| 2015/0226358 | A1 | 8/2015 | Boatman et al. |
| 2019/0359294 | A1 | 11/2019 | Sullivan |
| 2019/0360319 | A1 | 11/2019 | Samuelsberg et al. |
| 2020/0156926 | A1 | 5/2020 | Bishop et al. |
| 2021/0163278 | A1 * | 6/2021 | Huijsmans-Steenkamp ................ B63B 27/25 |
| 2021/0171159 | A1 * | 6/2021 | Duensing .............. B63B 22/026 |

* cited by examiner

SYSTEMS AND PROCESSES FOR RECOVERING A CONDENSATE FROM A CONDUIT

CROSS-REFERENCE TO RELATED APPLICATION

This application claims priority to U.S. Provisional Patent Application No. 63/428,908, filed on Nov. 30, 2022, which is incorporated by reference herein.

FIELD

Embodiments described generally relate to offshore single point mooring marine terminals. More particularly, such embodiments relate to offshore mooring buoys configured to transfer fluids to and from a vessel moored thereto and systems and processes for using same.

BACKGROUND

In the drilling, production, and transportation of offshore liquid hydrocarbons, mooring buoys have been used to connect a floating vessel to loading/unloading capabilities away from shore. A single point mooring (SPM) marine terminal includes a loading/unloading buoy anchored offshore that serves as a mooring link between geostatic subsea pipeline end manifold (PLEM) connections and the floating vessel. The buoy includes a material transfer system that transports liquid hydrocarbons between the pipeline end manifold and the vessel, for example from the pipeline end manifold into a vessel storage tank. The buoy connects to the pipeline end manifold using one or more submarine conduits, riser lines, or hoses. The pipeline end manifolds connect to pipelines that carry liquid hydrocarbons to and from near-shore or on-shore facilities or locations for distribution and/or processing.

During loading operations, a vessel is moored to a conventional SPM marine terminal. One or more floating transport lines or hoses are placed in fluid communication with the vessel storage tank and the SPM marine terminal. Liquid hydrocarbons are then conveyed from the pipeline, through the submarine lines, the buoy, the floating transport lines, and into the vessel storage tank(s). Conventional liquid hydrocarbon carrying vessel storage tanks are designed to safely operate within specified pressure ranges. As the liquid hydrocarbon is introduced into the vessel storage tank, fluid, e.g., a gas, within the tank is displaced such that a pressure within the vessel storage tank can be maintained within the specified ranges. Current processes for controlling the pressure within the tank include venting, displacing, or otherwise discharging the fluid directly to the atmosphere.

There is a need, therefore, for improved systems and processes for capturing fluid displaced from vessel storage tanks during loading operations that avoid or substantially reduce the fluid from being introduced into the atmosphere.

SUMMARY

Systems and processes for recovering a condensate from a conduit are provided. In some embodiments, the system can include a buoy that can be configured to float in a body of water. The buoy can include a fluid swivel assembly coupled thereto. The fluid swivel assembly can include a first swivel section rotatably coupled to a second swivel section that define a first fluid flow path and a second fluid flow path therethrough that are segregated from one another. The system can also include buoyant conduit that can be configured to float in the body of water. The buoyant conduit can be configured to be in fluid communication with a first gas transfer conduit that can be in fluid communication with the first fluid flow path defined by the first swivel section. The system can also include a second gas transfer conduit in fluid communication with the first fluid flow path defined by the second swivel section. The buoyant conduit, the first gas transfer conduit, the first fluid flow path defined by the first and second swivel sections, and the second gas transfer conduit can be configured to transfer a gas discharged from a vessel storage tank to a gas pipeline. The buoyant conduit can be configured to have a low point between the vessel storage tank and the first gas transfer conduit. The system can also include a first liquid transfer conduit that can be configured to be in fluid communication with a liquid pipeline and the second fluid flow path defined by the second swivel section. The system can also include a second liquid transfer conduit that can be configured to be in fluid communication with the second fluid flow path defined by the first swivel section and the vessel storage tank. The system can also include a condensation conduit that can have a first end that can be configured to be in fluid communication with an internal volume of the buoyant conduit and a second end that can be configured to be in fluid communication with the second fluid flow path defined by the first and second swivel sections, the second liquid transfer conduit, or the first liquid transfer conduit. The condensation conduit can be configured to transfer at least a portion of any condensate that accumulates within the internal volume of the buoyant conduit at the low point into the second fluid flow path defined by the first and second swivel sections, the second liquid transfer conduit, or the first liquid transfer conduit.

In some embodiments, the process for recovering a condensate from a conduit can include conveying a gas from a vessel storage tank through a floating conduit and into a first gas transfer conduit. The gas can be conveyed through the first gas transfer conduit and into a first fluid flow path defined by a fluid swivel assembly coupled to a floating buoy. A portion of the gas can condense within an internal volume of the floating conduit at a low point of the floating conduit during transfer of the gas therethrough to produce a liquid condensate. A liquid can be conveyed from a liquid pipeline located at a subsea location through a first liquid transfer conduit, through a second fluid flow path defined by the fluid swivel assembly, through a second liquid transfer conduit, and into the vessel storage tank. At least a portion of the liquid condensate can be conveyed from the internal volume of the floating conduit via a condensation conduit into the second fluid flow path defined by the fluid swivel assembly, the second liquid transfer conduit, or the first liquid transfer conduit.

BRIEF DESCRIPTION OF THE DRAWINGS

The various aspects and advantages of the preferred embodiment of the present invention will become apparent to those skilled in the art upon an understanding of the following detailed description of the invention, read in light of the accompanying drawings which are made a part of this specification. The drawings described herein are for illustrative purposes only of selected embodiments and not all possible implementations and are not intended to limit the scope of the present disclosure. Like reference numerals shown throughout the drawings represent similar parts throughout the embodiments shown in the drawings.

DETAILED DESCRIPTION

Figure 1:
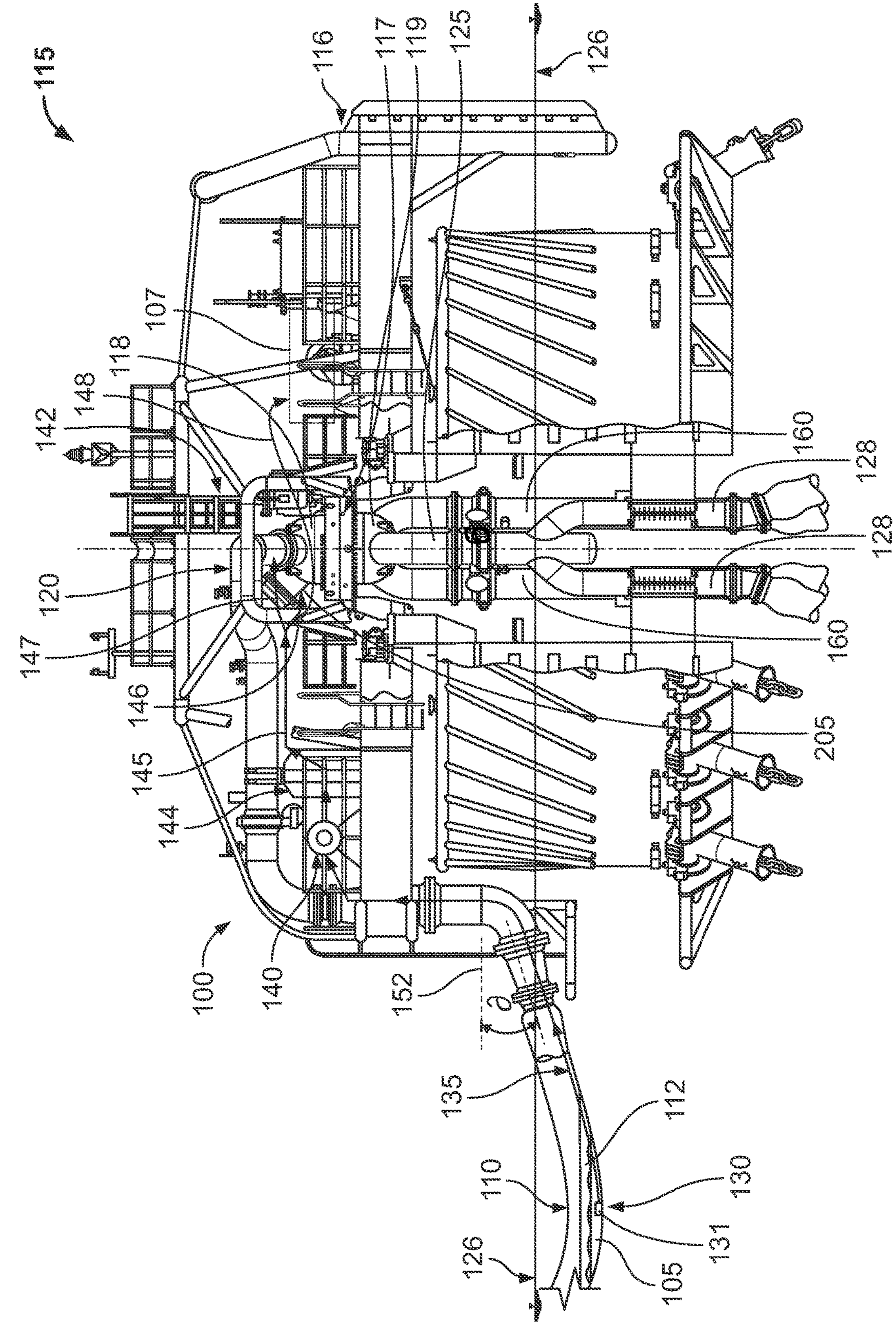
FIG. 1 depicts a schematic partial elevation view of an illustrative buoy having a condensation conveyance apparatus for recovering a condensate from a floating conduit coupled to the buoy, according to one or more embodiments described.

A detailed description will now be provided. Each of the appended claims defines a separate invention, which for infringement purposes is recognized as including equivalents to the various elements or limitations specified in the claims. Depending on the context, all references to the "invention", in some cases, refer to certain specific or preferred embodiments only. In other cases, references to the "invention" refer to subject matter recited in one or more, but not necessarily all, of the claims. It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the Figures. Moreover, the formation of a first feature over or on a second feature in the description that follows includes embodiments in which the first and second features are formed in direct contact and also includes embodiments in which additional features are formed interposing the first and second features, such that the first and second features are not in direct contact. The exemplary embodiments presented below may be combined in any combination of ways, i.e., any element from one exemplary embodiment may be used in any other exemplary embodiment, without departing from the scope of the disclosure. The figures are not necessarily drawn to scale and certain features and certain views of the figures can be shown exaggerated in scale or in schematic for clarity and/or conciseness.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Also, the naming convention used herein is not intended to distinguish between components that differ in name but not function. Furthermore, in the following discussion and in the claims, the terms "including" and "comprising" are used in an open-ended fashion, and thus should be interpreted to mean "including, but not limited to."

All numerical values in this disclosure are exact or approximate values ("about") unless otherwise specifically stated. Accordingly, various embodiments of the disclosure may deviate from the numbers, values, and ranges disclosed herein without departing from the intended scope.

Further, the term "or" is intended to encompass both exclusive and inclusive cases, i.e., "A or B" is intended to be synonymous with "at least one of A and B," unless otherwise expressly specified herein. The indefinite articles "a" and "an" refer to both singular forms (i.e., "one") and plural referents (i.e., one or more) unless the context clearly dictates otherwise. The terms "up" and "down"; "upward" and "downward"; "upper" and "lower"; "upwardly" and "downwardly"; "above" and "below"; and other like terms used herein refer to relative positions to one another and are not intended to denote a particular spatial orientation since the apparatus and methods of using the same may be equally effective at various angles or orientations.

Figure 2:
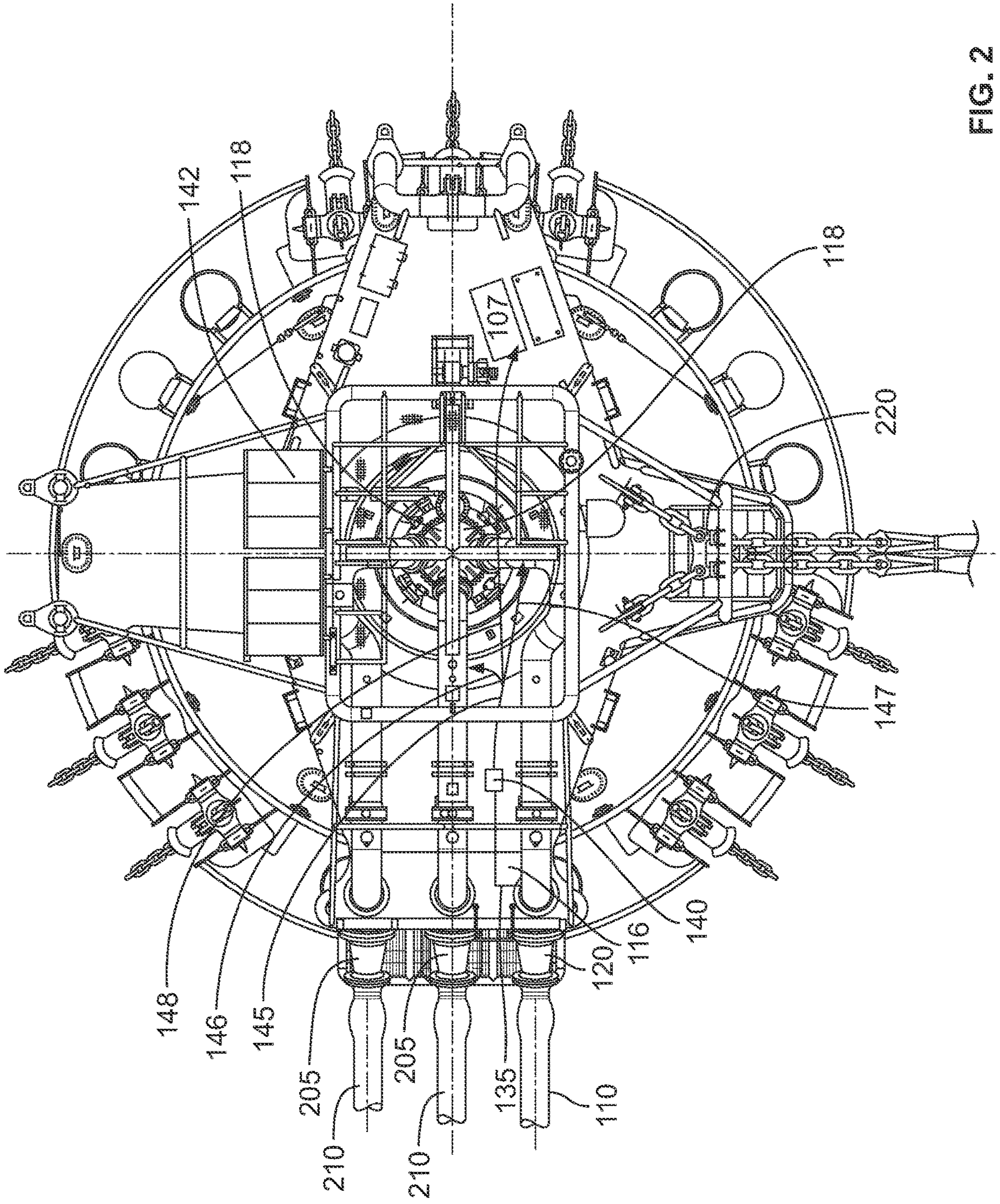
FIG. 2 depicts a schematic plan view of the buoy and the condensation conveyance apparatus shown in FIG. 1.

FIG. 1 depicts a schematic partial elevation view of an illustrative buoy 115 having a condensation conveyance apparatus 100 for recovering a condensate 105 from a first floating or buoyant conduit 110 coupled to the buoy 115, according to one or more embodiments. FIG. 2 depicts a schematic plan view of the buoy 115 and the condensation conveyance apparatus 100 shown in FIG. 1. The first floating or buoyant conduit 110 can be adapted or configured to convey a gas, e.g., from a floating vessel, through the buoy 115, e.g., through a first flow path defined by a first swivel section 118 and a second swivel section 119 of a fluid swivel assembly 117 coupled to the buoy 115, and into a gas pipeline, e.g., a gas pipeline 330 shown in FIG. 3. In some embodiments, the gas pipeline can be located at a subsea location.

In some embodiments, the gas can be or can include, but is not limited to, an exhaust gas, air, an inert gas such as nitrogen or carbon dioxide, one or more hydrocarbon gases, ammonia, water vapor, or any mixture thereof. In some embodiments, the gas can primarily be an exhaust gas, e.g., an exhaust gas from a vessel, that can be or can include, but is not limited to, nitrogen, oxygen, carbon monoxide, carbon dioxide, one or more nitrogen oxides (NOx), one or more sulfur oxides (SOx), water vapor, one or more hydrocarbons, particulate matter, e.g., soot, or any mixture thereof. In some embodiments, when the gas is conveyed through the first floating or buoyant conduit 110, at least a portion of the gas can condense and pool or otherwise collect within a low point 130 of the first floating or buoyant conduit 110 as the condensate 105. In some embodiments, the condensate 105 can be composed of primarily one component in the gas, e.g., a liquid hydrocarbon, liquid water, liquid ammonia (if conditions are such that liquid ammonia can be present), or the like. In other embodiments, the condensate can be composed of a mixture of two or more components present in the gas, e.g., liquid water and a liquid hydrocarbon, liquid water and ammonia in the form of aqueous ammonia, two or more liquid hydrocarbons having different chemical structures, or liquid water and two or more liquid hydrocarbons.

In some embodiments, the condensation conveyance apparatus 100 can include a first condensation conduit 135, a pump 140, and a second condensation conduit 145. The first condensation conduit 135, the pump 140, and the second condensation conduit 145 can be adapted or configured to convey at least a portion of the condensate 105 from within the floating or buoyant conduit 110 to another location. In some embodiments, the condensate 105 can be conveyed from the floating or buoyant conduit 110, through the pump 140, into the second condensation conduit 145, and, as shown, via conduit 146 into a second liquid transfer conduit 205 that can be in fluid communication with a second flow path defined by the first swivel section 118 of the fluid swivel assembly 117 or into the second fluid flow path defined by the first swivel section 118 and/or the second swivel section 119 (not shown) or into a first liquid transfer conduit 160 (not shown). In some embodiments, the second liquid transfer conduit 205 can transfer a liquid from the second fluid flow path defined by the first swivel section 118 to a storage tank disposed on a vessel as discussed in more detail below. As such, the particular location along the second liquid transfer conduit 205 that the condensate 105 can be introduced can be at any location between the first swivel section 118 and the vessel storage tank. In other embodiments, the particular location along the second flow path defined by the first and second swivel sections 118, 119 that the condensate 105 can be introduced can be any location within the second fluid path defined by the first and second swivel sections 118, 119. In other embodiments, the particular location along the first liquid transfer conduit 160 that the condensate 105 can be introduced can be any location between a liquid pipeline (328, sec FIG. 3) and the second swivel section 119 of the fluid swivel assembly 117.

In other embodiments, a first portion or quantity of the condensate 105 in line 145 can be transferred via line 146 into the second liquid transfer conduit 205 and/or the second flow path defined by the first and second swivel sections 118, 119 and/or the first liquid transfer conduit 160 and a second portion or quantity of the condensate 105 in line 145 can be transferred via line 147 into a first gas transfer conduit 120 and/or the first flow path defined by the first and second swivel sections 118, 119, via line 148 into the optional condensate storage tank 107, and/or to a service vessel (not shown).

A first end of the first condensation conduit 135 can be in fluid communication with an internal volume 112 of the first floating or buoyant conduit 110 such as at the low point 130. In some embodiments, at least a portion of the first condensation conduit 135 can be disposed within the first floating or buoyant conduit 110. In some embodiments, a weight of the first end of the first condensation conduit 135 can be sufficient to urge the first end of the first condensation conduit 135 toward the low point 130 of the first floating or buoyant conduit 110. In other embodiments, the first end of the first condensation conduit 135 can be coupled directly to an inner wall of the first floating or buoyant conduit 110 in fluid communication with the internal volume 112, for example via one or more mechanical fasteners. In some embodiments, a filter 131 can be coupled to the first end of the first condensation conduit 135 such that a filter inlet can be in fluid communication with the internal volume 112 and a filter outlet can be in fluid communication with the first end of the first condensation conduit 135. The filter 131 can be adapted or configured such that the filter inlet can convey condensate 105 from the low point 130, for example by adapting or configuring the filter 131 with sufficient weight to cause the inlet of the filter 131 to face the low point 130.

In other embodiments, the first end of the first condensation conduit 135 can be in fluid communication with the internal volume 112 of the first floating or buoyant conduit 110 at the low point 130 via an aperture disposed through a wall of the first floating or buoyant conduit 110. In this embodiment, the first end of the first condensation conduit 135 can be maintained in fluid communication with the low point 130 of the first floating or buoyant conduit 110 by being coupled directly to the wall of the first floating or buoyant conduit 110. In other embodiments, an aperture disposed through the wall of the first floating or buoyant conduit 110 can permit at least a portion of the condensate 105 to drain or otherwise flow, for example by using the pump 140 or a secondary pump, into an external sump volume and the first end of the first condensation conduit 135 can be in fluid communication with the external sump volume.

The pump 140 can include an inlet that can be in fluid communication with a second end of the first condensation conduit 135. The second condensation conduit 145 can have a first end in fluid communication with an outlet of the pump 140 and a second end in fluid communication with the second liquid transfer conduit 205 and/or the second flow path defined by the first swivel section 118 via line 146. In some embodiments, the second condensation conduit 145 can have a first end in fluid communication with the outlet of the pump 140 and a second end in fluid communication with the second liquid transfer conduit 205 and/or the second flow path defined by the first and second swivel sections 118, 119 via line 146 and/or the first liquid transfer conduit 160 (not shown) and, optionally, the first gas transfer conduit 120 and/or the first flow path defined by the first and second swivel sections 118, 119 via line 147, the condensate storage tank 107 via line 148, and/or transferred to a service vessel (not shown).

The pump 140 can be a positive displacement pump, a centrifugal pump, or any type of pump. In some embodiments, the pump 140 can be or can include an air driven positive displacement or diaphragm pump, an electric powered pump, a hydraulic driven pump, a hydrocarbon powered pump, and/or any other power source capable of driving the pump. In some embodiments, when the pump is an air driven pump, compressed air to drive the air driven pump can be stored in an air tank 144 disposed on the buoy 115. The air tank 144 can be an accumulator tank and can collect a volume of air at pressures of between about 50 pounds per square inch gauge (psig) to about 100 psig or from about 75 psig to about 150 psig, or greater, for driving the air driven pump. In some embodiments, the air tank 144 can be adapted or configured to contain a volume of compressed air sufficient to operate the air driven pump as needed between maintenance activities on the buoy 115. In other embodiments, an air compressor can be in fluid communication with the air tank 144 and can be adapted or configured to introduce compressed air into the tank 144 when the pressure falls below a pre-determined pressure. In some embodiments, electric power to run safety lights, an electrically driven pump, if present, the air compressor, and/or other equipment can be produced by a solar panel and power storage assembly 142 disposed on the buoy 115, for example on an upper surface of a turntable 116. In other embodiments, the electric power can be provided via a power cable from an alternate location, for example, on-shore, a near-by platform, or a vessel, e.g., a vessel moored to the buoy 115. A hydraulic delivery system can be disposed on the buoy 115 to run a hydraulic driven pump. Natural gas, propane, gasoline, diesel fuel, and/or other hydrocarbons, along with the necessary equipment to provide power to a hydrocarbon driven pump, the air compressor, or any other equipment on the buoy 115, can be stored on the buoy 115 to run the hydrocarbon driven pump.

The first condensation conduit 135 and the second condensation conduit 145 can each be or can include one continuous conduit segment or one or more conduit segments coupled together. The first condensation conduit 135 and the second condensation conduit 145 can convey liquids such as the condensate 105. The first condensation conduit 135 and the second condensation conduit 145 can be made from any suitable material. For example, the condensation conduits can be made from a synthetic fiber such as polyester or nylon filament, rubber, synthetic rubbers, metal alloys, or other suitable materials. It should be understood that the conduits 146, 147, and 148 are called out separately to more clearly describe the location(s) the second end of the conduit 145 can be in fluid communication with. It should also be understood that one or more valves can be located in the second condensation conduit 145 that can be configured to prevent fluid communication between the outlet of the pump 140 and the second end of the conduit 145/146, 145/147, and/or 145/148. If such optional valve is present, the valve can be opened when removal of the condensate 105 from the internal volume 112 of the first floating or buoyant conduit 110 is carried out and closed when such operation is not being carried out. In some embodiments, the optional valve, if present, can be one or more check valves. In other embodiments, the optional valve, if present, can be a butterfly valve, a ball valve, a gate valve, a globe valve, a needle valve, a pinch valve, a plug valve, or other valve that can be operated manually or remotely. For example, as further described below, in some embodiments electric power can be provided to the buoy 115. If such electric power is available, a controller can be disposed on the buoy 115 that can be operated remotely, e.g., from a vessel 305 during transfer of the liquid to a vessel storage tank 310 (see FIG. 3), to acuate the valve.

When a sufficient amount of condensate 105 collects within the first floating or buoyant conduit 110 at the low point 130, the pump 140 can be operated to cause a suction within the first condensation conduit 135. The suction can convey at least a portion of the condensate 105 from the internal volume 112 to the inlet of the pump 140. The pump 140 can expel the condensate 105 from the outlet and into the second condensation conduit 145 and convey at least a portion of the condensate 105 via line 146 into the second liquid transfer conduit 205 and/or the second flow path defined by the first swivel section 118. In some embodiments, a portion of the condensate 105 expelled from the outlet of the pump 140 can be conveyed via line 148 to the optional condensate storage tank 107, via line 137 to the first gas transfer conduit 120 and/or the flow path including the fluid swivel assembly 117, or a combination thereof. It should be understood that in some embodiments, the second condensation conduit 145 can be the outlet of the pump 140. For embodiments, the outlet of the pump 140 can be coupled directly to and in fluid communication with the second liquid transfer conduit 205 and/or the second flow path defined by the first swivel section 118 and, optionally, the first gas transfer conduit 120 and/or the first flow path defined by the first swivel section 118, and/or the condensate storage tank 107.

Figure 3:
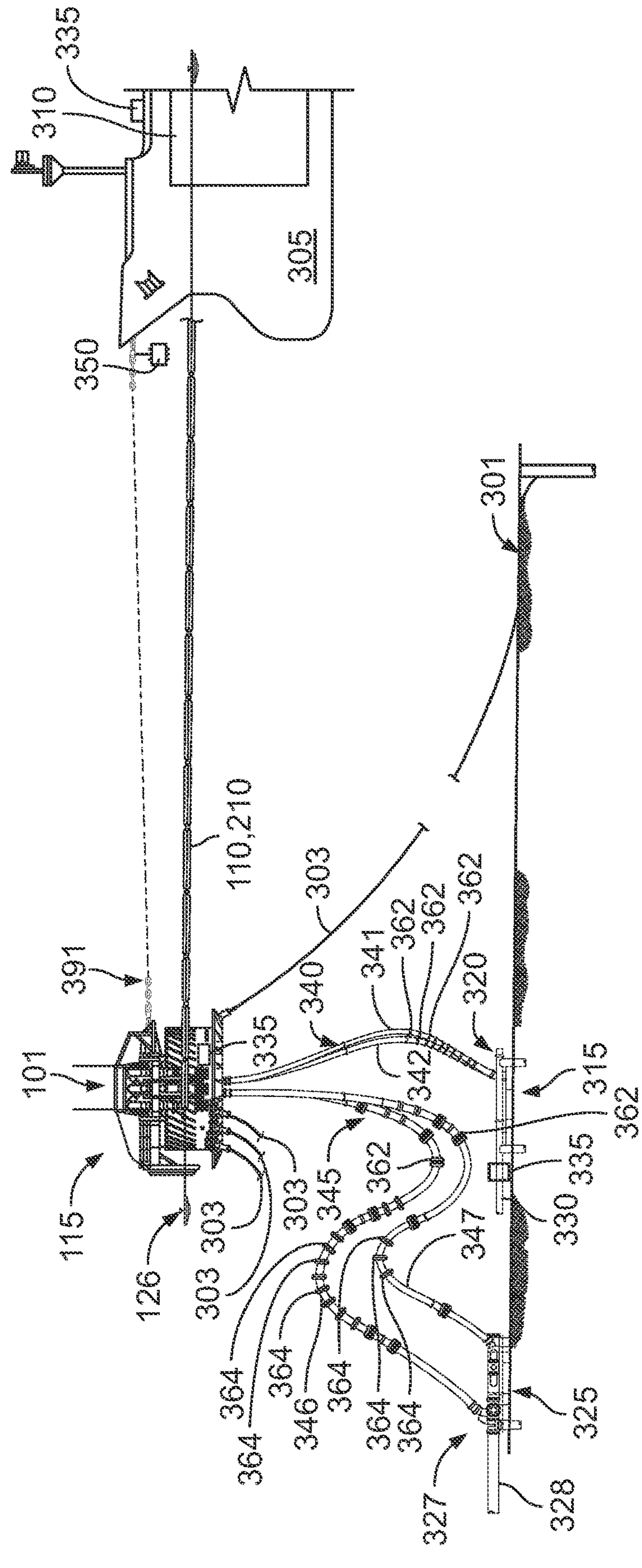
FIG. 3 depicts a schematic elevation view of an illustrative single point mooring marine terminal having a floating vessel moored thereto, according to one or more embodiments described.
Figure 4:
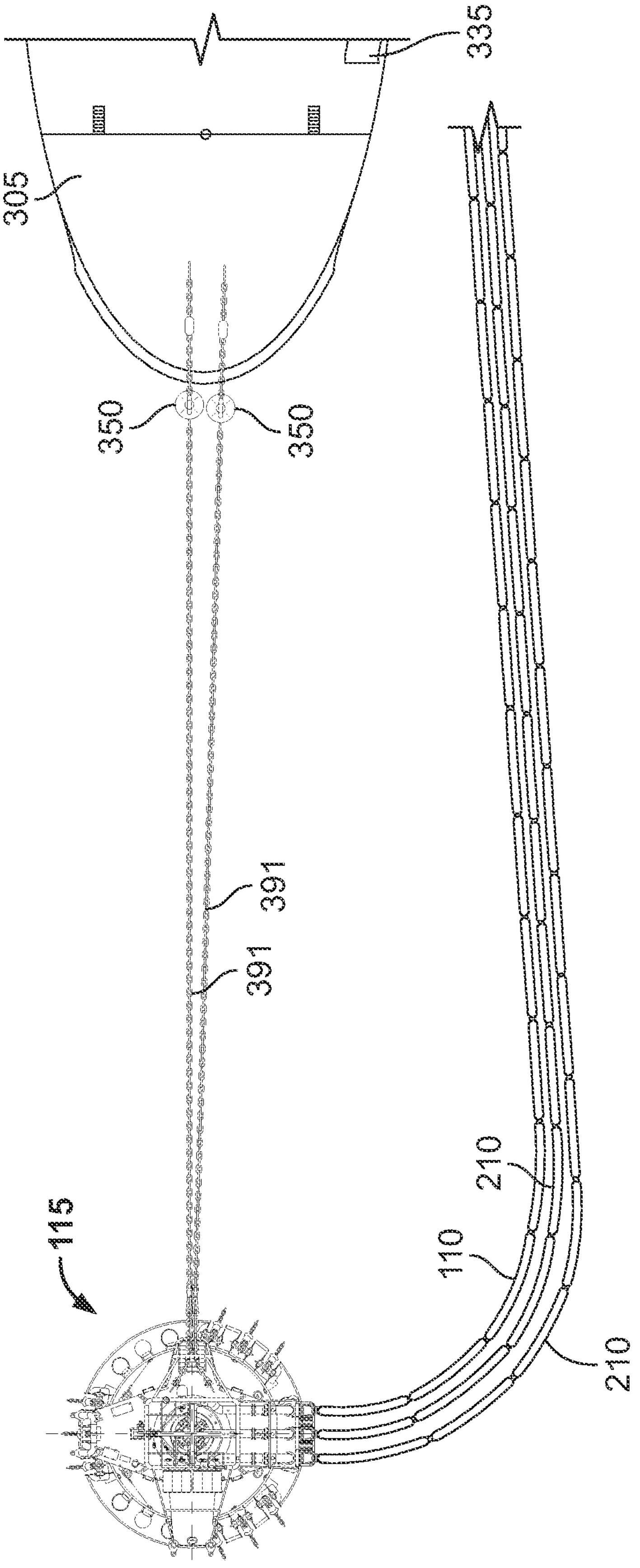
FIG. 4 depicts a schematic plan view of the single point mooring marine terminal shown in FIG. 3 described.

FIG. 3 depicts a schematic elevation view of an illustrative single point mooring marine terminal 101 having a floating vessel 305 moored thereto, according to one or more embodiments. FIG. 4 depicts a schematic plan view of the single point mooring marine terminal 101 as shown in FIG. 3. Referring now to FIG. 3 and FIG. 4, the floating vessel 305 can include the vessel storage tank 310. For example, the floating vessel 305 can be a floating production, storage, and offloading (FPSO) vessel, a floating storage and offloading (FSO) vessel, or a conventional liquid carrying tanker which may be a very large crude carriers (VLCC), and ultra large crude carriers (ULCCs), or any other size liquid carrying tanker. The floating vessel 305 can be moored to the buoy 115. In some embodiments, the vessel 305 can be moored to the buoy 115 via a Hawser arrangement 391. The Hawser arrangement 391 can be or include nylon rope, which can be shackled to a mooring uni-joint 220 on the buoy 115. A load pin 350 can be applied to the Hawser arrangement 391 to measure hawser loads. The Hawser arrangement 391 can be adapted or configured with one or more ropes depending on the tonnage of floating vessel 305. The ropes can be single-leg or grommet leg type ropes. By "vessel" it can be meant any type of floating structure including but not limited to tankers, boats, ships, and the like.

Referring now to FIGS. 1, 3, and 4, in some embodiments, the buoy 115 can be in fluid communication with a gas submarine conduit 340 and a first pipeline end manifold 315. In some embodiments, the buoy 115 can be in fluid communication with a liquid submarine conduit 345 and a second pipeline end manifold 325. The first pipeline end manifold 315 can be in fluid communication with a gas pipeline 330. The second pipeline end manifold 325 can be in fluid communication with a liquid pipeline 328. It should be understood that the first pipeline end manifold 315 and/or the second pipeline end manifold 325 can also be referred to as a pipeline end termination (PLET).

In some embodiments, the first pipeline end manifold 315 and/or the second pipeline end manifold 325 can be located at a subsea location, e.g., on the seafloor 301. In other embodiments, the first pipeline end manifold 315 and/or the second pipeline end manifold 325 can be located at or above the surface of the body of water 126. For example, the first pipeline end manifold 315 and/or the second pipeline end manifold 325 can be located on a platform or other structure above the surface of the body of water 126. In some embodiments, the gas pipeline 330 and/or the liquid pipeline 328 can be located at a subsea location, e.g., on the seafloor 301. In other embodiments, the gas pipeline 330 and/or the liquid pipeline 328 can be located on a platform, jetty, or other structure above the surface of the body of water 126.

In some embodiments, the buoy 115 can be a catenary anchor leg mooring (CALM) type buoy, as depicted, or as a single anchor leg mooring (SALM) type buoy as described below with reference to FIG. 9. In some embodiments, the buoy 115 can be or can include the turntable 116 rotatably coupled to the buoy 115, as depicted, which is typically referred to as a "turntable buoy". In other embodiments, the buoy 115 can be or include a rotatable floating buoy coupled to a relatively geostationary turret, which is typically referred to as a "turret buoy". On a turret buoy, the turret can be suspended from a rotatable floating buoy and the turret can be coupled to the seafloor 301. The fluid swivel assembly 117 can be coupled to the turntable 116 or the rotatable floating buoy. As such, the buoy 115 can be what is typically called a turret buoy, a turntable buoy, or a single anchor leg mooring type buoy. The floating vessel 305 can be moored to the turntable 116 or the rotatable floating turret and can weathervane about the buoy 115.

The buoy 115 can float in a body of water 126 and can be coupled or otherwise secured to the seafloor 301 by one or more anchor legs 303. The buoy 115 can be held in a relatively geostationary condition by the one or more anchor legs 303. As noted above, the fluid swivel assembly 117 can include a first swivel section 118. The first swivel section 118 can be rotatably coupled to a second swivel section 119. The first swivel section 118 rotatably coupled to the second swivel section 119 can define the first fluid flow path and the second fluid flow path therethrough that can be segregated from one another. The first gas transfer conduit 120 can be in fluid communication with the first swivel section 118 and a second gas transfer conduit 125 can be in fluid communication with the second swivel section 119. The first swivel section 118 and the second swivel section 119 can be adapted or configured to maintain fluid communication between the first gas transfer conduit 120 and the second gas transfer conduit 125 during rotation therebetween and when there is no rotation therebetween.

The first floating or buoyant conduit 110 can be in fluid communication with the vessel storage tank 310. The second gas transfer conduit 125 can be in fluid communication with the first pipeline end manifold 315, e.g., via the gas submarine conduit 340. In some embodiments, the second gas transfer conduit 125 can extend from the second swivel section 119 and transition into two or more second gas transfer conduits 128 (two are shown) and the two or more second gas transfer conduits 128 can be in fluid communication with the first pipeline end manifold 315. The first floating or buoyant conduit 110, the first gas transfer conduit 120, and the second gas transfer conduit 125 can be adapted or configured to transfer or convey the gas displaced or otherwise conveyed from the vessel 305, for example from the vessel storage tank 310, to the first pipeline end manifold 315 located at a first subsea location 320.

The gas can be displaced from the vessel storage tank 310 to keep a pressure within the vessel storage tank 310 within a specified range when introducing a liquid into the vessel storage tank 310. An end of the first gas transfer conduit 120 can be coupled to an end of the first floating or buoyant conduit 110. In some embodiments, the end of the first gas transfer conduit 120 coupled to the first floating or buoyant conduit 110 can have a declination angle ∂ relative to a local horizontal 152 of the buoy 115. Accordingly, a portion of the first floating or buoyant conduit 110 can have a declination angle ∂. The declination angle ∂ can be from about one degree, about five degrees, or about 10 degrees to about 20 degrees, about 30 degrees, or about forty degrees from the local horizontal 152. The declination angle ∂ can cause the low point 130 within the first floating or buoyant conduit 110. It should be noted that the local horizontal 152 may stay static with regard to the buoy 115 while a declination angle relative to a surface of the body of water 126 may change with wave action and other perturbations of the buoy 115.

The flow path including the fluid swivel assembly 117 can include the first swivel section 118, the second swivel section 119, the second gas transfer conduit 125, the gas submarine conduit 340, and the first pipeline end manifold 315. In some embodiments, when a portion of the condensate 105 flows via line 145 and 147 into the first gas transfer conduit 105 and/or the first swivel section 118, the second condensation conduit 145 can be coupled to a portion of the first gas transfer conduit 120 and/or the first swivel section 118 via line 147 and located such that any condensate 105 conveyed into the first gas transfer conduit 120 and/or the first swivel section 118 from lines 145 and 147 can fall down the first gas transfer conduit 120 through a path defined by the first swivel section 118 and/or directly into the flow path defined by the first swivel section 118, through the second swivel section 119, and down to the first pipeline end manifold 315. In some embodiments, at least a portion of the condensate 105 can collect or pool within a portion of the first pipeline end manifold 315 or the gas pipeline 330. The gas pipeline 330 can be an elongated conduit. The gas pipeline 330 can be in fluid communication with and span from the first pipeline end manifold 315 to another location, such as a near-shore or on-shore facility or location. The first floating or buoyant conduit 110, the first gas transfer conduit 120, the fluid swivel assembly 117, the second gas transfer conduit 125, the gas submarine conduit 340, the first pipeline end manifold 315, and the gas pipeline 330 can be adapted or configured to transfer or convey the gas from the floating vessel 305 and/or the vessel storage tank 310 to the near-shore or on-shore location. In some embodiments, if a portion of the condensate 105 flows into the first pipeline end manifold 315, the condensate 105 can be removed from the first pipeline end manifold 315 and/or the gas pipeline 330 utilizing a pipeline pig, for example, during a pigging maintenance operation.

In some embodiments, if the storage tank 107 is used, the storage tank 107 can be disposed on the buoy 115, e.g., on the turntable 116, can float adjacent the buoy 115, or can be located within or adjacent to the first subsea location 320. In some embodiments, when the storage tank 107 is subsea, the storage tank can be in fluid communication with the flow path including the fluid swivel assembly 117. The storage tank 107 can be adapted or configured to contain sufficient amounts of the condensate 105 such that removal of the condensate 105 from the storage tank 107 can be performed during normal maintenance activities for the buoy 115. The storage tank 107 can be made from any suitable material. For example, the storage tank 107 can be made from a synthetic fiber such as polyester or nylon filament, rubber, synthetic rubbers, a steel alloy, a polyvinyl chloride plastic, or other suitable materials.

A first liquid transfer conduit 160 (two are shown) can be in fluid communication with the second swivel section 119 and, as noted above, the second liquid transfer conduit 205 (two are shown) can be in fluid communication with the second flow path defined by the first swivel section 118. The first swivel section 118 and the second swivel section 119 can be adapted or configured to maintain fluid communication between the first liquid transfer conduit 160 and the second liquid transfer conduit 205 during rotation therebetween and when there is no rotation therebetween.

In some embodiments, the second pipeline end manifold 325 can be located at a second subsea location 327. The liquid pipeline 328 can be an elongated conduit. The liquid pipeline 328 can be in fluid communication with and span from the second pipeline end manifold 325 to another location, such as the near-shore or on-shore facility or location. The second pipeline end manifold 325 can be in fluid communication with the first liquid transfer conduit

160. The second liquid transfer conduit 205 can be in fluid communication with a second floating or buoyant conduit 210 (two are shown). The second floating or buoyant conduit 210 can be in fluid communication with the vessel 305 and/or the vessel storage tank 310. The liquid pipeline 328, the second pipeline end manifold 325, the first liquid transfer conduit 160, the fluid swivel assembly 117, the second liquid transfer conduit 205, and the second floating or buoyant conduit 210 can be adapted or configured to convey a liquid, for example a liquid hydrocarbon, from the near-shore or on-shore location to the vessel 305 and/or the vessel storage tank 310. It should be understood and, as noted above, the second liquid transfer conduit 205 can also include the second floating or buoyant conduit 210 for purposes of where the condensate 105 can be introduced into. In other words, the second liquid transfer conduit 205 includes the conduit disposed on the buoy 115 and the second floating or buoyant conduit 210 that can be located in the water and not on the buoy 115 that can be in fluid communication with the vessel storage tank 310.

The liquid transferred from the liquid pipeline 328 to the vessel 305 and/or the vessel storage tank 310 can be or can include, but is not limited to, raw hydrocarbons such as crude oil or a fraction thereof, refined hydrocarbons such as, but not limited to, diesel fuel, jet fuel, kerosene, and/or gasoline, water, ammonia, or any mixture thereof. The gas in the vessel storage tank 310 can be displaced from the vessel storage tank 310 simultaneously with the introduction of the liquid into the vessel storage tank 310.

In some embodiments, the gas submarine conduit 340 can be adapted or configured to convey, in addition to the gas, liquids such as a portion of the condensate 105. The gas submarine conduit 340 can include a first submarine conduit 341 and a second submarine conduit 342. The gas submarine conduit 340 can be in fluid communication with the first pipeline end manifold 315 and the second gas transfer conduit 125. The gas submarine conduit 340 can be coupled between the first pipeline end manifold 315 and the second gas transfer conduit 125 for fluid communication therebetween. The gas submarine conduit 340 can be coupled between the first pipeline end manifold 315 and the two or more second gas transfer conduits 128 for fluid communication therebetween.

In some embodiments, the gas submarine conduit 340 can be configured in a Chinese lantern configuration between the buoy 115 and the first subsea location 320. For example, the first and second submarine conduits 341, 342 can each include one or more negatively buoyant members 362 coupled thereto between the first pipeline end manifold 315 and the second gas transfer conduit 125. In some embodiments, the one or more negatively buoyant members 362 can be coupled thereto between the first pipeline end manifold 315 and a midpoint of each of the first and second submarine conduits 341, 342. In other embodiments, the one or more negatively buoyant members 362 can be coupled to the first and second submarine conduits 341, 342 between the first pipeline end manifold 315 and the midpoint of each of the first and second submarine conduits 341, 342 and one or more negatively buoyant members 362 can be coupled to each of the first and second submarine conduits 341, 342 between the midpoint and the second gas transfer conduit 125. In still other embodiments, the first and second submarine conduits 341, 342 can include one or more negatively buoyant members 362 and one or more positively buoyant members 364 coupled thereto between the first pipeline end manifold 315 and the second gas transfer conduit 125. The positively buoyant member(s) 364, if present, can be located between the midpoint and the second gas transfer conduit 125, between the first pipeline end manifold 315 and the midpoint, or a combination thereof. As such, in some embodiments, one or more negatively buoyant members 362 and one or more positively buoyant members 364 can be distributed along the first and second submarine conduits 341, 342 to maintain the first and second submarine conduits 341, 342 in the Chinese lantern configuration.

The one or more negatively buoyant members 362 can urge each of the first and second submarine conduits 341, 342 toward the seafloor 302 to maintain the first and second submarine conduits 341, 342 in the Chinese lantern configuration. In other embodiments, the gas submarine conduit 340 can be adapted or configured in a steep-S configuration or a lazy-S configuration between the buoy 115 and the first subsea location 320. The gas submarine conduit 340 can be adapted or configured to convey the gas from the fluid swivel assembly 117 to the first subsea location 320, e.g., the pipeline end manifold 315. The one or more negatively buoyant members 362 can be made from any suitable material that can sink in water, e.g., sea water. For example, the one or more negatively buoyant members 362 can be made from or include metal chains, cement, lead, natural stone, metal alloy, or other suitable materials. The one or more positively buoyant members 364 can be made from or include syntactic foams, foamed thermoset or thermoplastic materials, thermoset or thermoplastic materials filled with particles (such as glass, plastic, micro-spheres, and/or ceramics), rubber, nylon, composites of these materials, any other material buoyant in water, e.g., sea water, or any combination thereof.

In some embodiments, the liquid submarine conduit 345 can include a third submarine conduit 346 and a fourth submarine conduit 347. The liquid submarine conduit 345 can be in fluid communication with the second pipeline end manifold 325 and the first liquid transfer conduit 160. The liquid submarine conduit 345 can be coupled between the second pipeline end manifold 325 and the first liquid transfer conduit 160. The liquid submarine conduit 345 can be adapted or configured in a Chinese lantern configuration, a steep-S configuration, or a lazy-S configuration between the buoy 115 and the second subsea location 327. For example, one or more negatively buoyant members 362 and one or more positively buoyant members 364 can be distributed along each of the third and fourth submarine conduits 346, 347 to maintain the third and fourth submarine conduits 346, 347 in the Chinese lantern configuration, the steep-S configuration, or the lazy-S configuration. The Chinese Lantern, steep-S, and lazy-S configurations are all well known to people having ordinary skill in the art of subsea engineering or subsea riser engineering.

The gas submarine conduit 340 and the liquid submarine conduit 345 can be adapted or configured to compensate for motions of the buoy 115. The gas submarine conduit 340 and liquid submarine conduit 345 can be flexible and can be any type of elongated conduit. In some embodiments, the gas submarine conduit 340 and the liquid submarine conduit 345 can be comprised of a plurality of conduit segments connected together.

It should be understood that any of the conduits, e.g., the first floating or buoyant conduit 110, the second floating or buoyant conduit 210, the gas submarine conduit 340, the liquid submarine conduit 345, etc., can each be or can include a plurality of conduit segments connected thereto. The second floating or buoyant conduit 210 and the liquid submarine conduit 345 can convey fluids such as the liquid. The first floating or buoyant conduit 110, the second floating or buoyant conduit 210, the gas submarine conduit 340, and the liquid submarine conduit 345 can be made from any suitable material. For example, the first floating or buoyant conduit 110, the second floating or buoyant conduit 210, the gas submarine conduit 340, and the liquid submarine conduit 345 can be made from a synthetic fiber such as polyester or nylon filament, rubber, synthetic rubbers, metal alloys, or other suitable materials.

In some embodiments, the pressure developed within the vessel storage tank 310 during liquid loading may not be sufficient to push the gas all the way through the gas pipeline 330. Accordingly, one or more blowers 335 (three are shown) can be used to maintain the pressure within the vessel storage tank 310 within specified design ranges. In some embodiments the blower 335 can be located at the first subsea location 320, on the buoy 115, floating adjacent the buoy 115, on the floating vessel 305, on an adjacent platform, and/or on shore in fluid communication with the gas pipeline 330. The blower 335 can be adapted or configured to provide a propulsive force within the conduits to assist the gas conveyance through the pipeline 330. For example, the blower 335 can increase a mass flow of the gas that can be conveyed from the vessel storage tank 310 through the pipeline 330 to another location such as the near-shore or on-shore facility or location. The blower 335 can induce or otherwise produce a partial vacuum and/or increase a pressure within the gas pipeline 330, the first pipeline end manifold 315, the second gas transfer conduit 125, the first floating or buoyant conduit 110 and/or the first gas transfer conduit 120, to draw or otherwise urge the gas from the vessel 305 such that the gas can be conveyed to another location, such as the near-shore or on-shore facility or location.

The gas, once conveyed to the near-shore or on-shore facility or location, can be processed to reduce or remove at least a portion of one or more contaminants therefrom. In some embodiments, the gas can be an exhaust gas from the vessel that can include water and one or more contaminants. Such contaminants can be or can include, but are not limited to, one or more oxides of sulfur, one or more oxides of nitrogen, carbon monoxide, carbon dioxide, one or more hydrocarbons, and particulate matter, or any mixture thereof.

Figure 5:
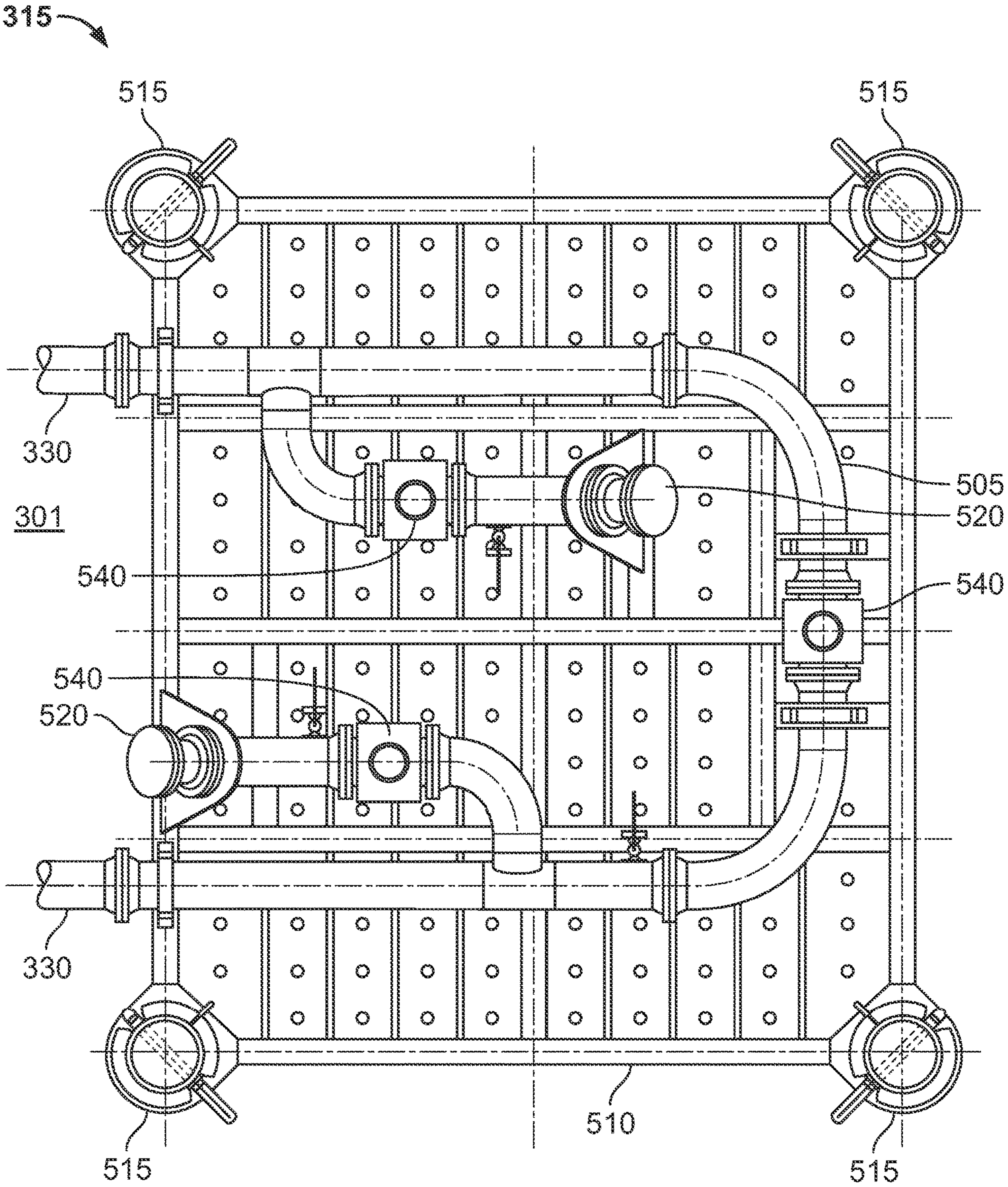
FIG. 5 depicts a schematic plan view of an illustrative first pipeline end manifold, according to one or more embodiments described.
Figure 6:
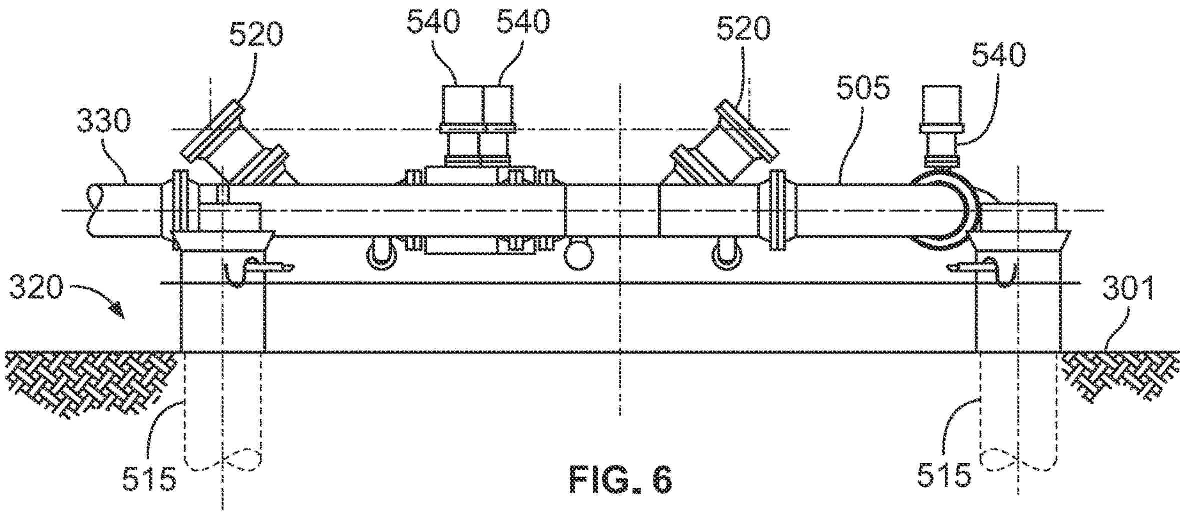
FIG. 6 depicts a schematic elevation view of the first pipeline end manifold shown in FIG. 5.

FIGS. 5 and 6 depict a schematic plan view and a schematic elevation view of the first pipeline end manifold 315, according to one or more embodiments. The first pipeline end manifold 315 can include a first pipeline end conduit 505 disposed on a skid 510. The skid 510 can be secured to the seafloor 301 by one or more piles 515 (four are shown) and/or ballast. The first pipeline end conduit 505 can include one or more valves 540 for fluid isolation within one or more portions of the first pipeline end conduit 505. One or more first interface connectors 520 (two are shown) can provide fluid communication from the first interface connectors 520 to the gas pipeline 330. The first pipeline end conduit 505 can have a U-shape or other curved shape to accommodate a pipeline pig for maintenance activities, for example for removal of the condensate 105 from the first pipeline end manifold 315 and/or the gas pipeline 330. In some embodiments, a protective cage can surround the first pipeline end conduit 505 and/or the first pipeline end manifold 315 for protection from various environmental hazards.

Figure 7:
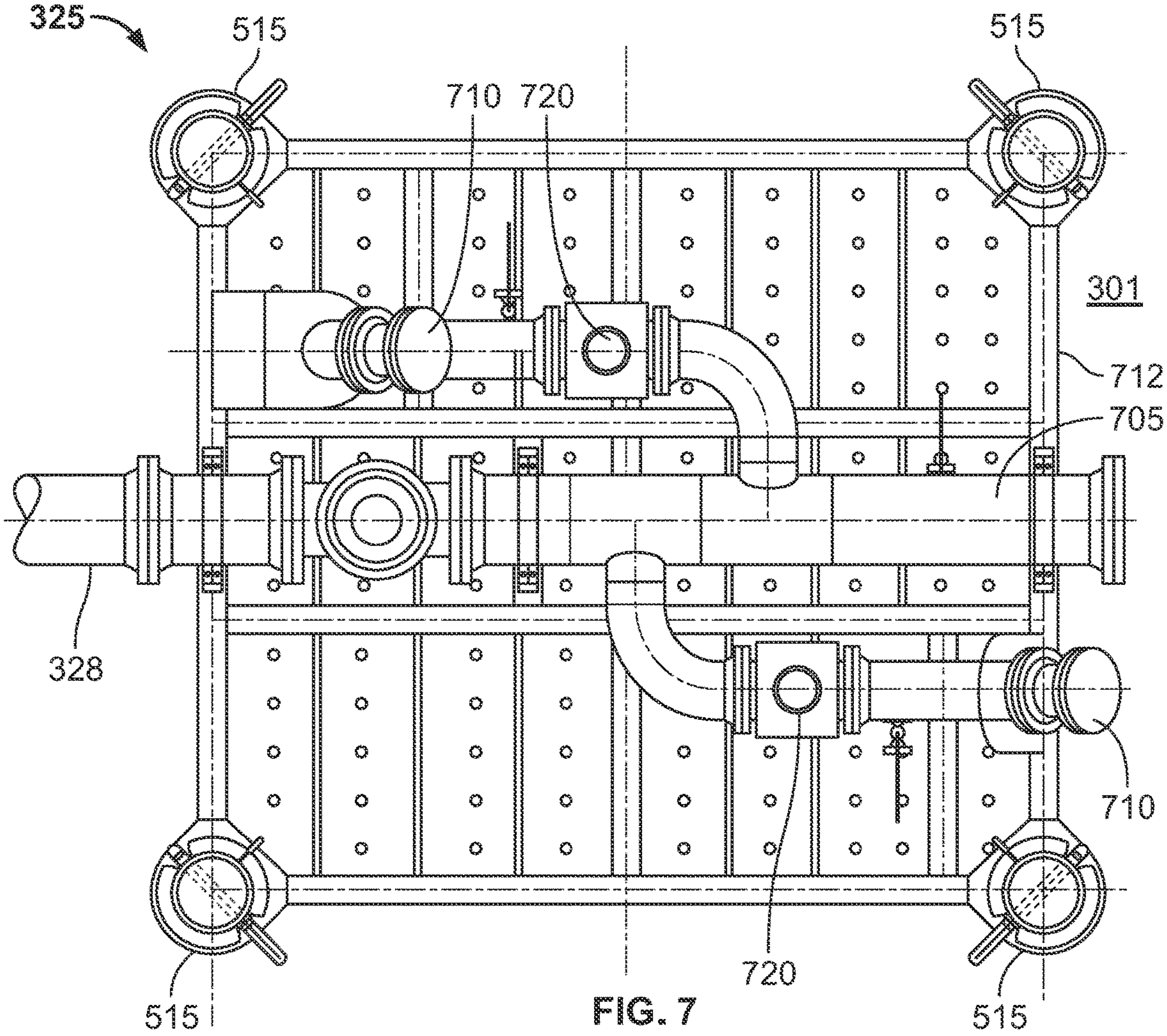
FIG. 7 depict a schematic plan view of an illustrative second pipeline end manifold, according to one or more embodiments described.
Figure 8:
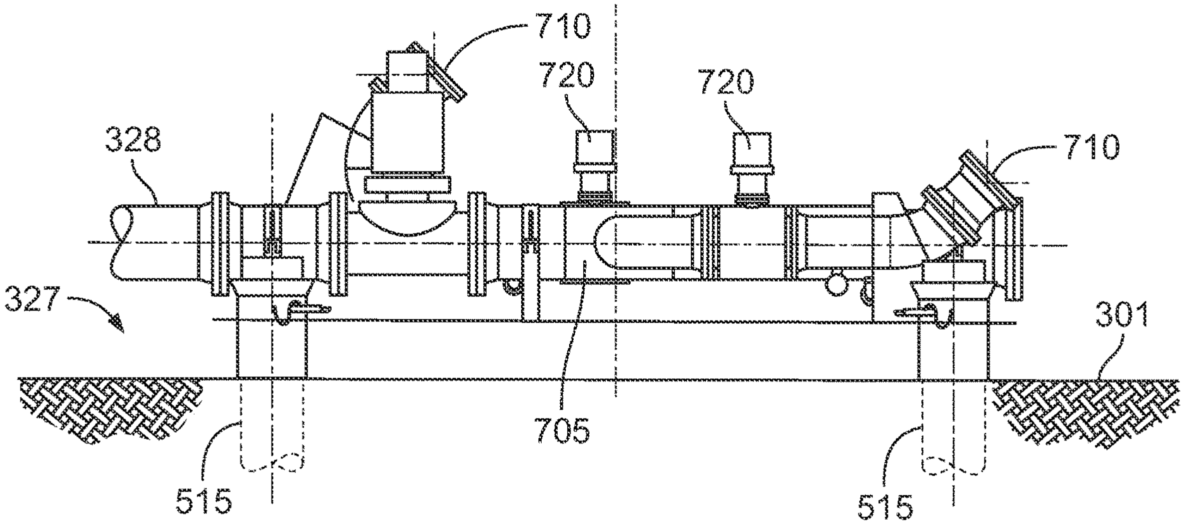
FIG. 8 depict a schematic elevation view of the second pipeline end manifold shown in FIG. 7.

FIGS. 7 and 8 depict a schematic plan view and a schematic elevation view of the second pipeline end manifold 325, according to one or more embodiments. The second pipeline end manifold 325 can include a second pipeline end conduit 705 disposed on a skid 712. The skid 712 can be secured to the seafloor 301 by the one or more piles 515 (four are shown) and/or ballast. The second pipeline end conduit 705 can include one or more valves 720 for fluid isolation within one or more portions of the second pipeline end conduit 705. One or more second interface connectors 710 (two are shown) can provide fluid communication from the second interface connectors 710 to the liquid pipeline 328. In some embodiments, protective cage can surround the second pipeline end conduit 705 and/or the second pipeline end manifold 325 for protection from various environmental hazards.

It should be understood that although the first pipeline end manifold 315 and the second pipeline end manifold 325 are depicted as being located at two locations 320, 327 on two different skids 510, 712 at some distance from one another, the first and second pipeline end manifolds 315, 325 can be located adjacent each other and/or formed or assembled on a single skid adapted or configured to accommodate the first pipeline end conduit 505 and the second pipeline end conduit 705.

Figure 9:
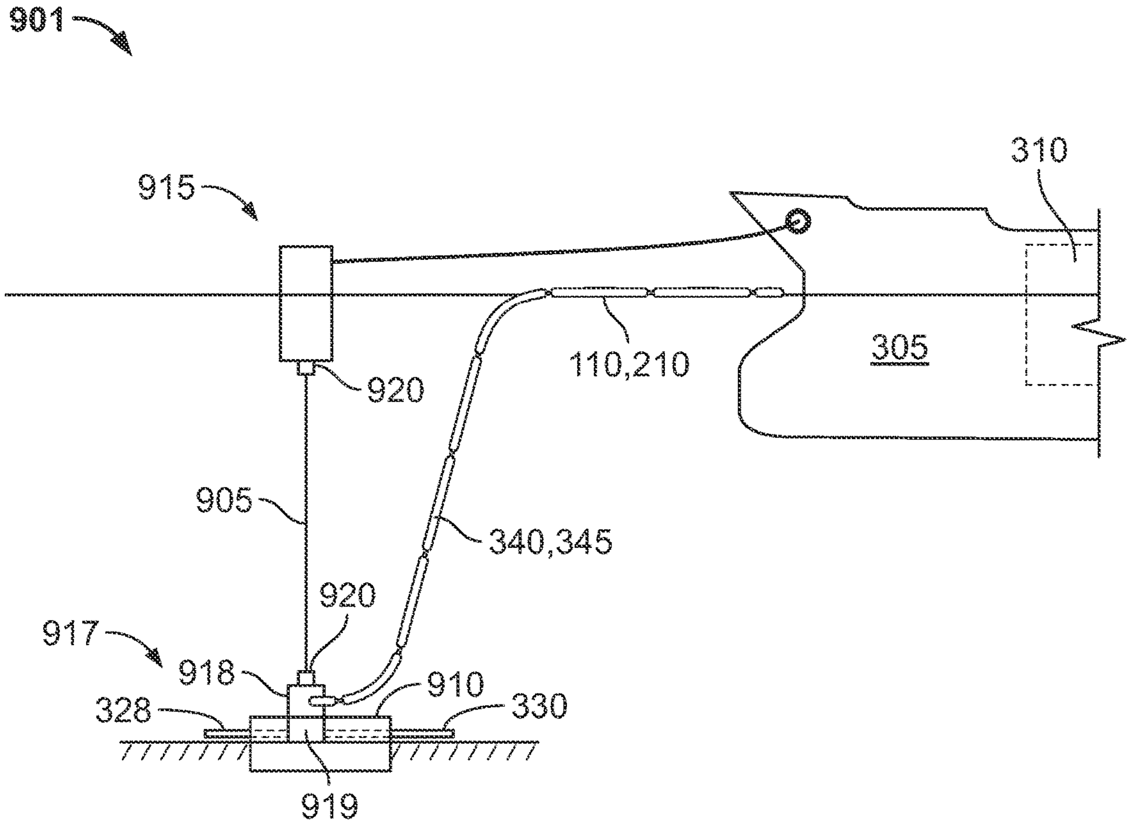
FIG. 9 depicts a schematic of another illustrative single point mooring marine terminal that includes a single anchor leg mooring (SALM) type buoy, according to one or more embodiments described.

FIG. 9 depicts a schematic of another illustrative single point mooring marine terminal 901 that includes a single anchor leg mooring (SALM) type buoy 915, according to one or more embodiments. The buoy 915 can be anchored to the seabed by a single anchor leg 905. The single anchor leg 905 can be connected to a base 910 which can be ballasted and/or piled to a subsea location 917. The single anchor leg 905 can be attached to the base 910 by either a chain or by an elongated conduit. One or more universal joints 920 (two are shown) can allow the buoy 915 and the floating vessel 305 to rotate about the anchor leg 905 and/or the base 910. The first floating or buoyant conduit 110 can be coupled to and in fluid communication with the gas submarine conduit 340. The second floating or buoyant conduit 210 can be coupled to and in fluid communication with the liquid submarine conduit 345. Although described as separate conduits, the first floating or buoyant conduit 110 and the gas submarine conduit 340 can be combined into a single gas conveyance conduit and the second floating or buoyant conduit 210 and the liquid submarine conduit 345 can be combined into single liquid conveyance conduit.

The gas submarine conduit 340 can be in fluid communication with the first swivel section 918 and the gas pipeline 330. The liquid submarine conduit 345 can be in fluid communication with the first swivel section 918 and the liquid pipeline 328. The first swivel section 918 and the second swivel section 919 can be adapted or configured to maintain fluid communication between the gas submarine conduit 340 and the gas pipeline 330 during rotation therebetween and when there is no rotation therebetween. The first swivel section 918 and the second swivel section 919 can be adapted or configured to maintain fluid communication between the liquid submarine conduit 345 and the liquid pipeline 328 during rotation therebetween and when there is no rotation therebetween. The liquid can be conveyed from the liquid pipeline 328, through the liquid submarine conduit 345, through the second floating or buoyant conduit 210 and to the vessel 305 and/or the vessel storage tank 310. Gas discharged from the vessel 305 and/or the vessel storage tank 310 can be conveyed through the first floating or buoyant conduit 110, through the gas submarine conduit 340, through the gas pipeline 330 to another location, such as the near-shore or on-shore facility or location.

Figure 10:
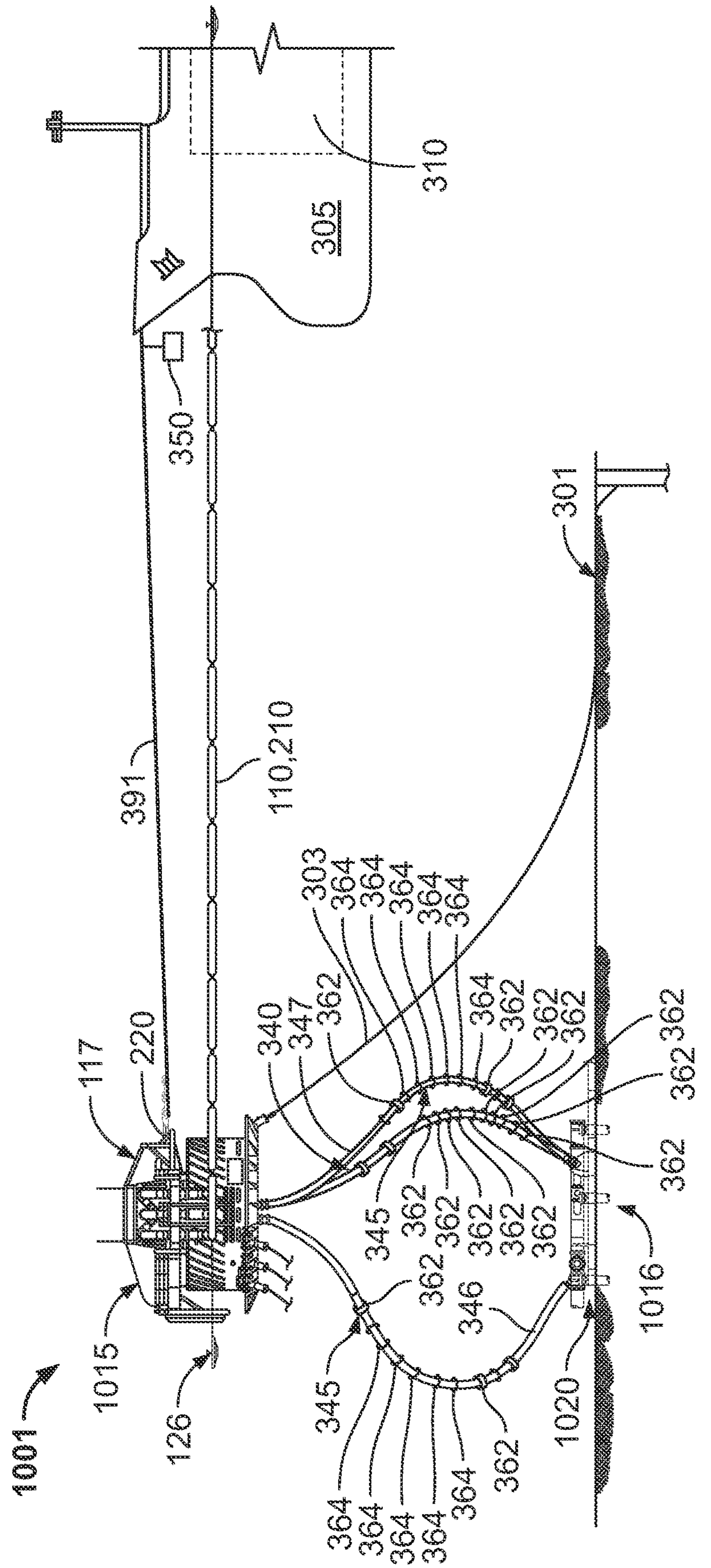
FIG. 10 depicts a schematic elevation view of yet another illustrative single point mooring terminal, including another illustrative buoy, according to one or more embodiments.
Figure 11:
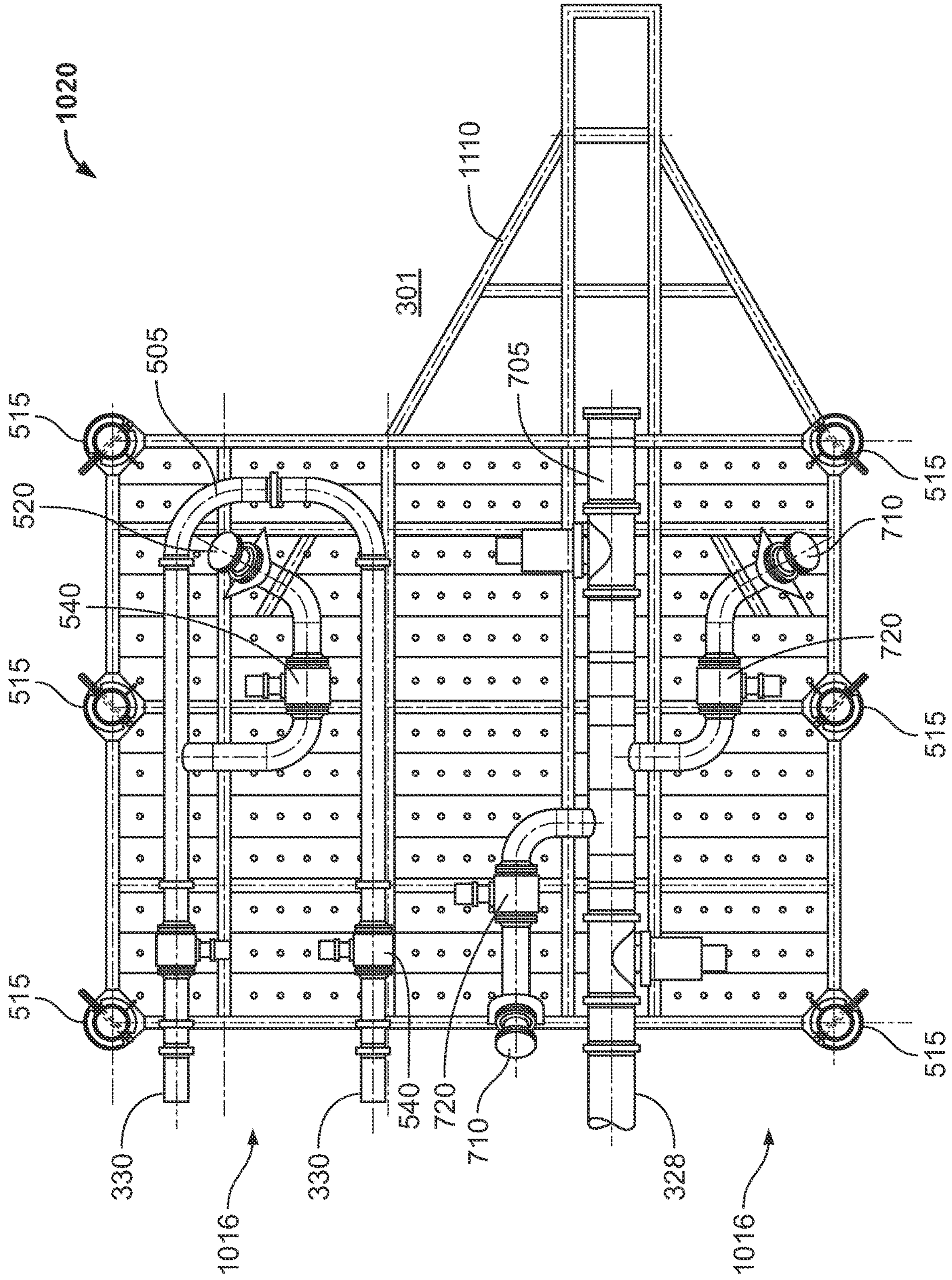
FIG. 11 depicts a schematic plan view of another pipeline end manifold, according to one or more embodiments described.

FIG. 10 depicts a schematic elevation view of yet another illustrative single point mooring terminal 1001, including another illustrative buoy 1015, according to one or more embodiments. FIG. 11 depicts a schematic plan view of another pipeline end manifold 1016, according to one or more embodiments. In some embodiments, the pipeline end manifold 1016 can be located at a subsea location 1020 and can include the first pipeline end conduit 505 and the second pipeline end conduit 705 disposed on a dual skid 1110. It should be understood that the pipeline end manifold 1016 can also be referred to as a pipeline end termination. The gas pipeline 330 can be in fluid communication with and span from the pipeline end manifold 1016 to another location, such as a near-shore or on-shore facility or location. The first floating or buoyant conduit 110, the gas submarine conduit 340 (one is shown), the first pipeline end conduit 505, and the gas pipeline 330 can be adapted or configured to transfer or convey the gas from the floating vessel 305 and/or the vessel storage tank 310 to the near-shore or on-shore location.

The liquid pipeline 328 can be in fluid communication with and span from the pipeline end manifold 1016 to another location, such as the near-shore or on-shore facility or location. The liquid pipeline 328, the second pipeline end conduit 705, the liquid submarine conduit 345 (two are shown), and the second floating or buoyant conduit 210 can be adapted or configured to convey the liquid, for example the liquid hydrocarbon, from the near-shore or on-shore location to the floating vessel 305 and/or the vessel storage tank 310. The gas in the vessel storage tank 310 can be displaced from the vessel storage tank 310 simultaneously with the introduction of the liquid into the vessel storage tank 310.

In some embodiments, the gas submarine conduit 340 can be configured in a Chinese lantern configuration between the buoy 1015 and the subsea location 1020. The gas submarine conduit 340 can include one or more negatively buoyant members 162 coupled thereto (ten are shown) between the pipeline end manifold 1016 and the buoy 1015. In some embodiments, the one or more negatively buoyant members 362 can be coupled thereto between the pipeline end manifold 1016 and a midpoint of the gas submarine conduit 340. In other embodiments, one or more negatively buoyant members 362 can be coupled to the gas submarine conduit 340 between the pipeline end manifold 1016 and the midpoint of the gas submarine conduit 340 and one or more negatively buoyant members 362 can be coupled to the gas submarine conduit 340 between the midpoint and the buoy 1015.

The liquid submarine conduit 345 can be adapted or configured in a Chinese lantern configuration. For example, one or more positively buoyant members 364 can be distributed along the third submarine conduit 346 and the fourth submarine conduit 347 to maintain the liquid submarine conduit 345 in the Chinese lantern configuration. One or more positively buoyant members 364 and one or more negatively buoyant members 362 can be distributed along the third submarine conduit 346 and the fourth submarine conduit 347 to maintain the liquid submarine conduit 345 in the Chinese lantern configuration. The liquid submarine conduit 345 can be adapted or configured to convey the liquid from the subsea location 1020, e.g., the pipeline end manifold 1016, to the fluid swivel assembly 117.

Figure 12:
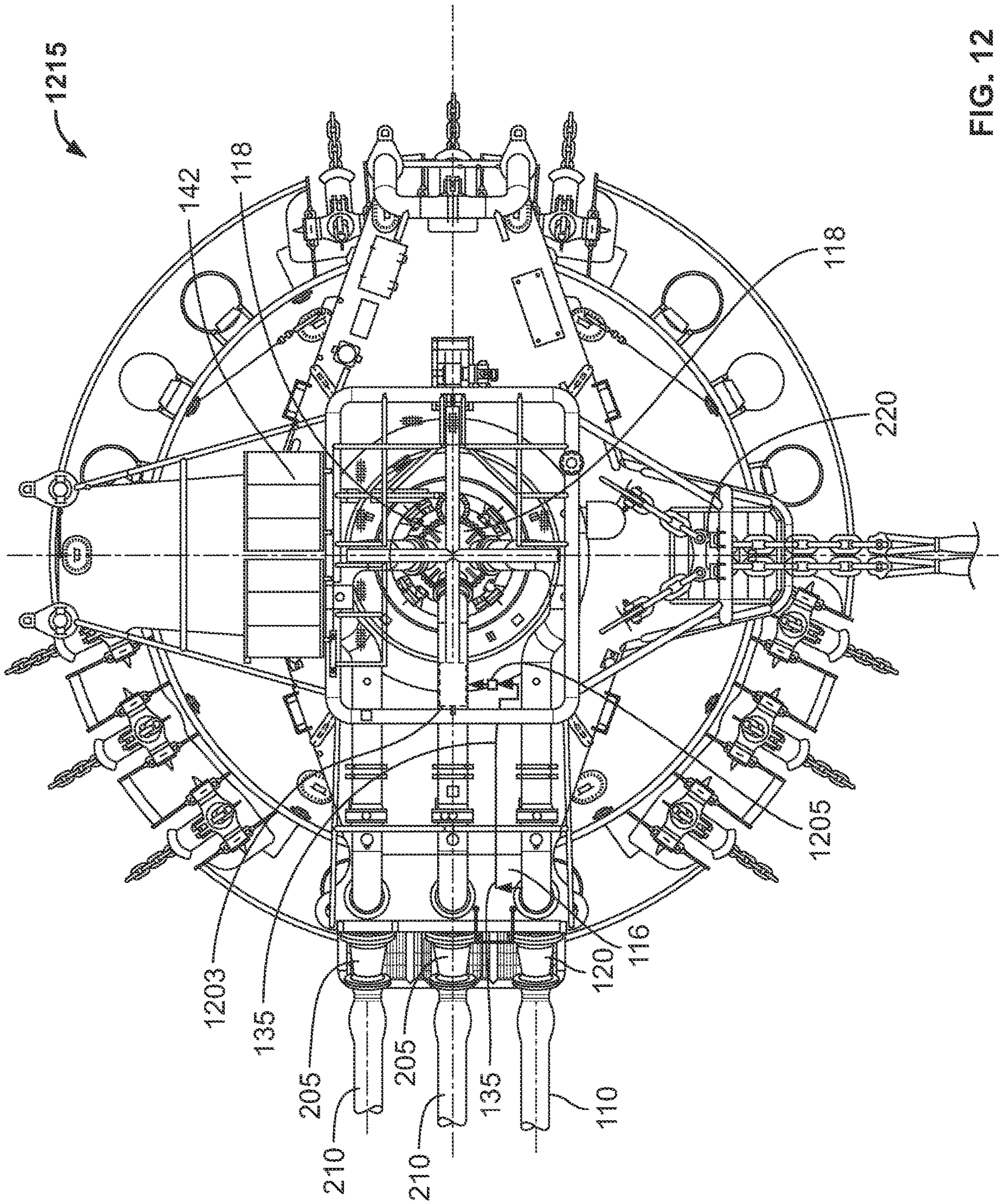
FIG. 12 depicts a schematic plan view of another illustrative buoy having a condensation conveyance apparatus for recovering a condensate from a floating conduit coupled to the buoy, according to one or more embodiments described.

FIG. 12 depicts a schematic plan view of another illustrative buoy 1215 having a condensation conveyance apparatus for recovering the condensate 105 (see FIG. 1) from the first floating or buoyant conduit 110 coupled to the buoy 1215, according to one or more embodiments. In some embodiments, the condensation conveyance apparatus can include the first condensation conduit or simply "condensation conduit" 135 (described above with reference to FIGS. 1 and 2) and an eductor 1203. Other common names for the eductor 1203 include, but are not limited to, a liquid eductor, a liquid-powered ejector, a vacuum ejector, a Venturi pump, a jet pump ejector, or simply an ejector.

In some embodiments, referring to FIGS. 12, 1, and 3, the eductor 1203 can be or can be configured to be in fluid communication with the condensation conduit 135 and the second liquid transfer conduit 205 (shown), or the second flow path defined by the first and second swivel sections 118, 119 (not shown), or the first liquid transfer conduit 160 (not shown), or the liquid submarine conduit 345 (not shown). The eductor 1203 can be configured to draw the condensate 105 into the second liquid transfer conduit 205 (shown), or into the second fluid flow path defined by the first and second swivel sections 118, 119, or into the first liquid transfer conduit 160, or into the liquid submarine conduit 345, when liquid flows from the liquid pipeline 328, through the liquid submarine conduit 345, through the first liquid transfer conduit 160, through the second flow path defined by the first and second swivel sections 118, 119, and through the second liquid transfer conduit 205. In some embodiments, when the eductor 1203 can be configured to be in fluid communication with the first liquid conduit 160, the eductor 1203 can be releasably connected to the condensation conduit 135 when the condensate 105 needs to be removed from the floating or buoyant conduit 110 and disconnected after removal of the condensate 105 from the floating or buoyant conduit 110.

In the eductor 1203, the liquid or at least a portion thereof transferred from the liquid pipeline 328 to the vessel 305 (see FIG. 3) via the second fluid flow path defined by the swivel 117 and the second liquid transfer conduit 205 can flow through a jet nozzle into a tube that can first narrow and then expand in cross-sectional area. As the liquid exits the jet nozzle, the liquid can have a sufficient velocity that can cause the liquid to have a relatively low pressure, which can generate a vacuum. The tube can then narrow into a mixing section where the liquid having a sufficient velocity can mix with the condensate 105 that can be drawn into the eductor 1203 via the vacuum. After the mixing section, the cross-sectional area of the tube can expand to decrease the velocity of the ejected stream and to allow the pressure to increase to the external pressure.

In some embodiments, in the eductor 1203, the liquid or at least a portion thereof transferred from the liquid pipeline 328 to the vessel 305 via the liquid submarine conduit 345, the first liquid transfer conduit 160, the second fluid flow path defined by the swivel 117, and the second liquid transfer conduit 205 can flow into an inlet of the eductor 1203, through a converging section of the eductor 1203 that can narrow in cross-sectional area, into and through a constricted throat, into and out of a diverging section, and out of the eductor 1203 via an outlet. As the liquid exits the throat and enters the diverging section, a region of low pressure in the eductor 1203 can be created that can draw the condensate 105 into the eductor 1203 through a suction inlet of the eductor 1203 and out of the floating or buoyant conduit 110. The condensate 105 can mix with the liquid and exit the outlet of the eductor 1203. The liquid or the at least a portion thereof introduced into the eductor 1203 as the motive or driving fluid can be at any suitable pressure and/or suitable flow rate that can generate a sufficient vacuum or suction for removing at least a portion of the condensate 105 from the floating or buoyant conduit 110.

In some embodiments, one or more valves 1205 can be in fluid communication with the condensation conduit 135 at a location between the low point 130 of the first floating or buoyant conduit 110 (see FIG. 1) and the eductor 1203. The valve 1205 can be configured to prevent liquid flowing from the liquid pipeline 328 to the vessel 305 from flowing into the floating or buoyant conduit 110. In some embodiments, the valve 1205 can be or can include one or more check valves. In other embodiments, the valve 1205 can be a butterfly valve, a ball valve, a gate valve, a globe valve, a needle valve, a pinch valve, a plug valve, or other valve that can be operated manually or remotely. For example, as noted above, in some embodiments, electric power can be provided to the buoy 115, which can also be provided to buoy 1215 in a similar manner. If such electric power is available, a controller can be disposed on the buoy 1215 that can be operated remotely, e.g., from the vessel 305 during transfer of the liquid to the vessel storage tank 310 (see FIG. 3), to acuate the valve 1205. In other embodiments, the valve 1205 can be manually opened and closed.

In other embodiments, a pump, e.g., the pump 140 shown in FIGS. 1 and 2, can be configured to convey water, e.g., water from the body of water 126 the buoy 1215 can be located in or a storage tank, e.g., storage tank 107 shown in FIG. 2, disposed on the buoy 1215 that can contain a liquid therein, into an inlet of the eductor 1203, where the suction inlet of the eductor 1203 can be in fluid communication with the condensate conduit 135 and the outlet of the eductor 1203 can be in fluid communication with the liquid submarine conduit 345, the first liquid transfer conduit 160, the second fluid flow path defined by the fluid swivel 117, and/or the second liquid transfer conduit 205. In such embodiment, the pump 140 can be utilized to provide water (or any other suitable liquid, e.g., a liquid hydrocarbon) as the motive fluid to operate the eductor 1203 and cause the eductor 1203 to remove at least a portion of the condensate 105 from the first floating or buoyant conduit 110.

In still other embodiments, a pressurized gas, e.g., air from air tank 144 (see FIG. 1), can be utilized as the motive or driving fluid to operate the eductor 1203. The liquid or gas, if used to operate the eductor 1203 can be at any suitable pressure and/or suitable flow rate that can generate a sufficient vacuum for removing at least a portion of the condensate 105 from the floating or buoyant conduit 110. As such, the eductor 1203 can be configured to generate a vacuum or suction sufficient to remove at least a portion of the condensate 105 from the floating or buoyant conduit 110 by using a gas, a liquid, or a mixture thereof as the motive or driving fluid.

In some embodiments, a valve can be located between the pump 140 (or pressurized gas source) and the inlet of the eductor 1203 and/or a valve can be located between the outlet of the eductor 1203 and the liquid submarine conduit 345, the first liquid transfer conduit 160, the second fluid flow path defined by the swivel 117, and/or the second liquid transfer conduit 205. In some embodiments, such valve can be a check valve. In other embodiments, such valve can be a butterfly valve, a ball valve, a gate valve, a globe valve, a needle valve, a pinch valve, a plug valve, or other valve that can be operated manually or remotely.

It should be understood that rather than a single point mooring marine terminal, other types of mooring systems can be used to moor the floating vessel during transfer or conveyance of the gas from the vessel to the subsea location. In some embodiments, the vessel can be moored via a spread mooring system during conveyance of the gas from the vessel to the subsea location. A suitable spread mooring system can include the disconnectable spread mooring and riser tower system disclosed in U.S. Pat. No. 11,198,490. In other embodiments, the vessel can be moored via a stabilized mooring system such as the stabilized mooring system disclosed in U.S. Pat. No. 11,316,036. In other embodiments, the vessel can be moored via a disconnectable tower yoke mooring system such as those disclosed in U.S. Pat. Nos. 9,650,110; 11,267,532; and 11,279,446. In other embodiments, the vessel can be moored via a disconnectable submerged yoke mooring system such as the mooring system disclosed in U.S. Pat. No. 11,738,828.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While certain preferred embodiments of the present invention have been illustrated and described in detail above, it can be apparent that modifications and adaptations thereof will occur to those having ordinary skill in the art. It should be, therefore, expressly understood that such modifications and adaptations may be devised without departing from the basic scope thereof, and the scope thereof can be determined by the claims that follow.

What is claimed is:

1. A system for recovering a condensate from a conduit, comprising:

a buoy configured to float in a body of water, the buoy comprising a fluid swivel assembly coupled thereto, wherein the fluid swivel assembly comprises a first swivel section rotatably coupled to a second swivel section that define a first fluid flow path and a second fluid flow path therethrough that are segregated from one another;

a buoyant conduit configured to float in the body of water, the buoyant conduit configured to be in fluid communication with a first gas transfer conduit that is in fluid communication with the first fluid flow path defined by the first swivel section;

a second gas transfer conduit in fluid communication with the first fluid flow path defined by the second swivel section, wherein the buoyant conduit, the first gas transfer conduit, the first fluid flow path defined by the first and second swivel sections, and the second gas transfer conduit are configured to transfer a gas discharged from a vessel storage tank to a gas pipeline, and wherein the buoyant conduit is configured to have a low point between the vessel storage tank and the first gas transfer conduit;

a first liquid transfer conduit configured to be in fluid communication with a liquid pipeline and the second fluid flow path defined by the second swivel section;

a second liquid transfer conduit configured to be in fluid communication with the second fluid flow path defined by the first swivel section and the vessel storage tank; and a condensation conduit having a first end configured to be in fluid communication with an internal volume of the buoyant conduit and a second end configured to be in fluid communication with the second fluid flow path defined by the first and second swivel sections, the second liquid transfer conduit, or the first liquid transfer conduit, wherein the condensation conduit is configured to transfer at least a portion of any condensate that accumulates within the internal volume of the buoyant conduit at the low point into the second fluid flow path defined by the first and second swivel sections, the second liquid transfer conduit, or the first liquid transfer conduit.

2. The system of claim 1, wherein the buoy is configured to be secured to the seafloor and held in a relatively geostationary condition by one or more anchor legs, and wherein the first swivel section is configured to rotate with a rotatable turntable coupled to the buoy.

3. The system of claim 1, wherein, when a floating vessel is moored to the buoy floating in the body of water, the floating vessel weathervanes about the buoy.

4. The system of claim 1, wherein:

the buoy comprises a turntable rotatably coupled to the buoy, the first swivel section is connected to and rotates with the turntable, and the second swivel section is connected to the floating buoy.

5. The system of claim 1, wherein the buoyant conduit, the first gas transfer conduit, the first fluid flow path defined by the first and second swivel sections, and the second gas transfer conduit are configured to transfer the gas discharged from the vessel storage tank to the gas pipeline via a pipeline end manifold.

6. The system of claim 1, wherein the first liquid transfer conduit, the second flow path defined by the first and second swivel sections, and the second liquid transfer conduit are configured to convey a liquid from the liquid pipeline to the vessel storage tank, and wherein the condensation conduit is configured to transfer the condensate into the second fluid flow path defined by the first and second swivel sections, the second liquid transfer conduit, or the first liquid transfer conduit at the same time the liquid is conveyed from the liquid pipeline to the vessel storage tank.

7. The system of claim 1, wherein a pump is in fluid communication with the second end of the condensation conduit and configured to transfer the condensate into the second fluid flow path defined by the first and second swivel sections, the second liquid transfer conduit, or the first liquid transfer conduit.

8. The system of claim 7, wherein:

the buoy comprises a turntable rotatably coupled to the buoy, the pump comprises an air driven pump, and the system further comprises an air tank disposed on the turntable that is configured to provide compressed air to the pump.

9. The system of claim 1, wherein an eductor is configured to be in fluid communication with the second end of the condensation conduit and the second fluid flow path defined by the first and second swivel sections, the second liquid transfer conduit, or the first liquid transfer conduit, and wherein the eductor is configured to draw the condensate into the second fluid flow path defined by the first and second swivel sections, the second liquid transfer conduit, or the first liquid transfer conduit when a liquid flows through the second fluid flow path defined by the first and second swivel sections, the second liquid transfer conduit, or the first liquid transfer conduit.

10. The system of claim 9, wherein a valve is in fluid communication with the condensation conduit at a location between the low point and the eductor, and wherein the valve is configured to prevent liquid flowing through the second fluid flow path defined by the first and second swivel sections, the second liquid transfer conduit, or the first liquid transfer conduit to flow into the buoyant conduit via the condensation conduit.

11. The system of claim 10, wherein the valve is a check-valve.

12. A process for recovering a condensate from a conduit, comprising:

conveying a gas from a vessel storage tank through a floating conduit and into a first gas transfer conduit;

conveying the gas through the first gas transfer conduit and into a first fluid flow path defined by a fluid swivel assembly coupled to a floating buoy, wherein a portion of the gas condenses within an internal volume of the floating conduit at a low point of the floating conduit during transfer of the gas therethrough to produce a liquid condensate;

conveying a liquid from a liquid pipeline located at a subsea location through a first liquid transfer conduit, through a second fluid flow path defined by the fluid swivel assembly, through a second liquid transfer conduit, and into the vessel storage tank; and conveying at least a portion of the liquid condensate from the internal volume of the floating conduit via a condensation conduit into the second fluid flow path defined by the fluid swivel assembly, the second liquid transfer conduit, or the first liquid transfer conduit.

13. The process of claim 12, wherein the floating buoy is a single point mooring marine terminal.

14. The process of claim 12, wherein:

the floating buoy comprises a turntable rotatably coupled to the floating buoy, the fluid swivel assembly comprises a first swivel section rotatably coupled to a second swivel section, the first swivel section is connected to and rotates with the turntable, and the second swivel section is connected to the floating buoy.

15. The process of claim 12, the at least a portion of the liquid condensate is conveyed from the internal volume of the floating conduit into the second flow path defined by the fluid swivel assembly, the second liquid transfer conduit, or the first liquid transfer conduit while the gas is conveyed from the vessel through the floating conduit and into the first gas transfer conduit.

16. The process of claim 12, wherein the condensation conduit has a first end in fluid communication with the internal volume of the floating conduit and a pump in fluid communication with a second end of the condensation conduit and the second fluid flow path defined by the fluid swivel assembly, the second liquid transfer conduit, or the first liquid transfer conduit.

17. The process of claim 16, wherein:

the floating buoy comprises a turntable rotatably coupled to the floating buoy, the pump comprises an air driven pump, and an air tank disposed on the turntable provides compressed air to the pump when the liquid condensate is conveyed from the internal volume into the second fluid flow path defined by the fluid swive assembly, the second liquid transfer conduit, or the first liquid transfer conduit.

18. The process of claim 12, wherein the condensation conduit has a first end in fluid communication with the internal volume of the floating conduit and an eductor in fluid communication with a second end of the condensation conduit and the second fluid flow path defined by the fluid swivel assembly, the second liquid transfer conduit, or the first liquid transfer conduit.

19. The process of claim 18, wherein the liquid condensate is conveyed through a valve located in the condensation conduit between the internal volume of the floating conduit and the eductor.

20. The process of claim 19, wherein the valve is a check valve.

* * * * *